United States Patent [19]

Deramaux et al.

[11] Patent Number: 5,345,754
[45] Date of Patent: Sep. 13, 1994

[54] PROCESS AND MECHANISM FOR JOINING MEMBERS

[75] Inventors: Jean-Michel Deramaux, Saint-Saulve; Bernard Caron, Aulnoye-Les-Valenciennes, both of France

[73] Assignee: Societe Des Forges De Fresnes, France

[21] Appl. No.: 37,564

[22] Filed: Mar. 22, 1993

[30] Foreign Application Priority Data

Mar. 24, 1992 [FR] France .................. 92 03517

[51] Int. Cl.$^5$ .................. B21L 13/00; F16G 15/02
[52] U.S. Cl. .................. 59/30; 59/35.1; 59/85
[58] Field of Search .................. 59/85, 30, 35.1

[56] References Cited

U.S. PATENT DOCUMENTS

| | | |
|---|---|---|
| 1,386,732 | 8/1921 | Reid . |
| 1,974,827 | 9/1934 | Lutts et al. .................. 59/35.1 |
| 2,382,345 | 8/1945 | St. Pierre .................. 59/35.1 |
| 2,400,854 | 2/1943 | Pierre . |

FOREIGN PATENT DOCUMENTS

| | | |
|---|---|---|
| 409134 | 2/1910 | France .................. 59/85 |
| 2581150 | 10/1986 | France .................. 59/85 |
| 0134336 | 11/1919 | United Kingdom .................. 59/35.1 |
| 1458875 | 12/1976 | United Kingdom . |

OTHER PUBLICATIONS

WO 81/00607 Bruce, Peter; Improved Joining Shackle Or Link Published 5 Mar. 1981.

Primary Examiner—David Jones
Attorney, Agent, or Firm—Barnes & Thornburg

[57] ABSTRACT

A process for assembling two facing extremities of members of detachable links and the detachable link formed by the process wherein two facing extremities of members are assembled using two half-shells joined by assembly components according to the following steps:

forming reliefs either on the inside surface of the half-shells, or on the outside surface of the member extremities with the other surface remaining smooth;

mounting the two half-shells on the member extremities;

forging reliefs on the initially smooth components by direct stamping onto the components displaying the reliefs;

joining the two half-shells by the said assembly components.

11 Claims, 4 Drawing Sheets

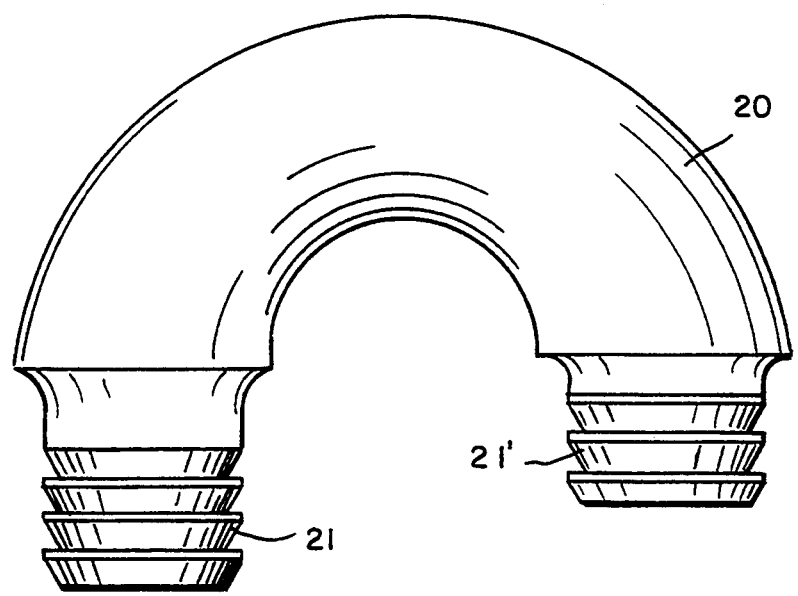
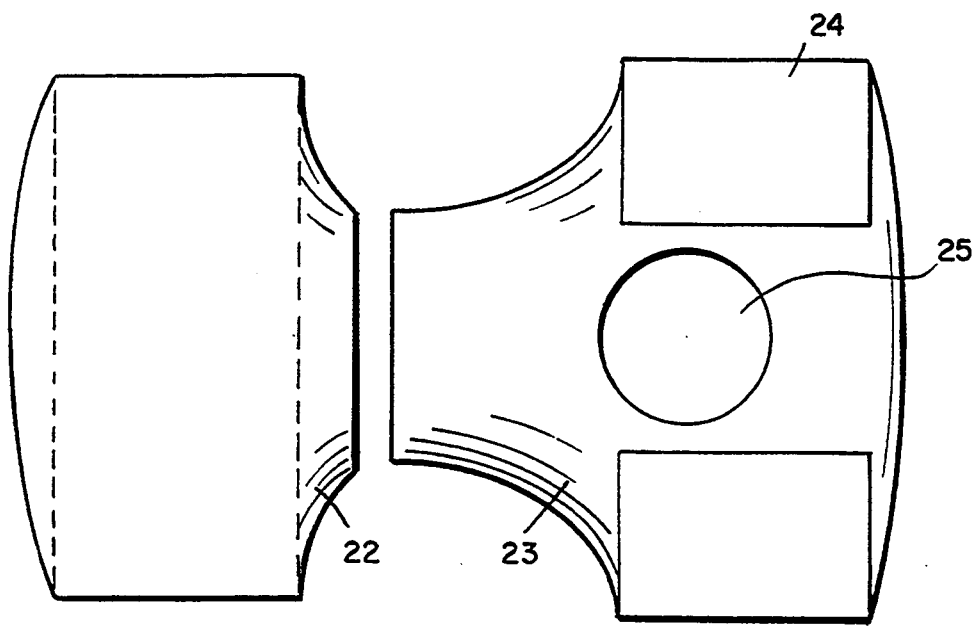

PROCESS AND MECHANISM FOR JOINING MEMBERS

BACKGROUND AND SUMMARY OF THE INVENTION

The invention relates to a process for assembling two facing extremities of members, and more specifically to such a process wherein the extremities are assembled by means of two half-shells joined by assembly components, and to a detachable link embodied by means of this process.

Detachable links are known comprising mortise and tenon joints, which are used to join sections of anchor chains for ships or oil drilling platforms.

In another known type of detachable link, two halves of the links are assembled and held together by means of two shells fastened with bolts, wherein the shells display ridges which cooperate with projections formed at the free ends of the link halves.

To provide adequate strength for the two aforesaid types of links, a great deal of care and precision is required in machining the parts that come into contact with one another, so as to minimize the amount of play in the assembly and to provide good tensile and fatigue strength. The cost of these numerous precision machining operations is relatively high.

An object of this invention is an assembly process and a detachable link implemented by means of this process requiring almost no machining of the contacting parts, and therefore costing much less than known processes and links.

To this effect, a first object of the invention is a process for assembling the two facing extremities of members by means of two half-shells joined together by assembly components such as bolts, characterized in that it comprises the following steps:
  reliefs are formed either on the inside surface of the half-shells, or on the outside surface of the member extremities;
  the half-shells are mounted on the member extremities;
  reliefs are forged on the initially smooth components by direct stamping onto the components displaying the reliefs;
  the two half-shells are joined by means of the said assembly components.

The expression "initially smooth" as used in this specification and in the accompanying claims means that the surface of these components has not been subjected to any machining whatsoever. On the other hand, they may be preformed by forging.

Therefore, the reliefs are formed initially on only one contact surface, and the corresponding reliefs on the other surface are formed directly by stamping from these initial reliefs. This ensures that there will be no play in the resulting assembly, thereby providing improved tensile and fatigue strength.

Moreover, it has been observed that although they are produced without machining, the reliefs formed by stamping onto the initially smooth surface are of good quality, and that reassembling the members after they have been disassembled does not present any particular problem.

In one particular embodiment, the reliefs are formed initially on the extremities of the members and the inside surfaces of the half-shells are smooth or merely initially preformed and then the reliefs in the half-shells are forged by stamping.

A further object of the invention is a detachable link for assembling and disassembling chain segments. This detachable link comprises at least two facing extremities of link members and two half-shells joined together by assembly components for assembling the said extremities, wherein the extremities of these link members are joined by the process described hereinabove.

In addition to the aforesaid advantages, the links according to the invention may be thinner for a given cross-section because of improved stress distribution and due to the fact that the metal fibers are not damaged by machine tools. Moreover, these links may readily be assembled and disassembled on site.

In a first embodiment, the said links are formed of two half-links with two pairs of facing extremities, and the two half-links are assembled by two half-shells so as to form a bridge over the gap in the link.

In a further embodiment, the said links are formed by an open ring, the two facing extremities of which are joined by two half-shells.

More particularly, each half-shell may comprise a projection which protrudes toward the other half-shell, these two projections being complementary, both being traversed by an assembly pin. Each projection is formed by a component inserted in a hole drilled in its respective half-shell and held in place in this hole by forging.

Advantageously, either the outside surface of the projecting member or the inside surface of the hole comprises reliefs which are stamped onto the other surface at the time of forging.

A still further object of the invention is a process of fabricating a detachable link for assembling and disassembling chain segments, wherein the said link comprises at least two facing extremities of link members and two half-shells joined together by assembly components for assembling the said extremities, characterized in that it comprises the following steps:
  reliefs are formed either on the inside surface of the half-shells, or on the outside surface of the extremities of the link members;
  a hole is drilled in each half shell, through the parts which are designed to face one another;
  two complementary assembly components are formed, each having an extremity designed to penetrate into one of the said holes;
  reliefs are formed either on the inside surface of the said holes, or on the outside surface of the extremities of the assembly components;
  each of the said extremities of the assembly components is inserted into one of the said holes and the half-shells are mounted on the extremities of the link members;
  reliefs are forged on the initially smooth parts facing the reliefs that are preformed by direct stamping on the said reliefs;
  the two half-shells are joined by means of an assembly pin inserted through two aligned holes formed in the overlapping parts of the two halves of the assembly components.

The said aligned holes may be drilled after forging from the outside of the link.

They may also be drilled before forging and may be used to join temporarily the two halves of the assembly components.

In one particular embodiment of this process, intended for the fabrication of a link consisting of two half-links comprising two pairs of facing extremities, reliefs are formed either on the inside surface of a sheath, or on the outside surface of the extremities of the other pair of extremities, the said other extremities are inserted in the sleeve, and these other extremities are forged simultaneously with the aforesaid first extremities.

Other objects, advantages and novel features of the present invention will become apparent from the following detailed description of the invention when considered in conjunction with the accompanying drawings.

BRIEF DESCRIPTION OF THE DRAWINGS

FIG. 5 is a plan view of a half-link according to a still further embodiment of the invention;

FIG. 6 illustrates a sleeve intended for the assembly of two half-links such as the link of FIG. 5;

FIG. 7 is a plan view of a half-shell corresponding to the half-link of FIG. 5;

DETAILED DESCRIPTION OF THE DRAWINGS

Figure 1:
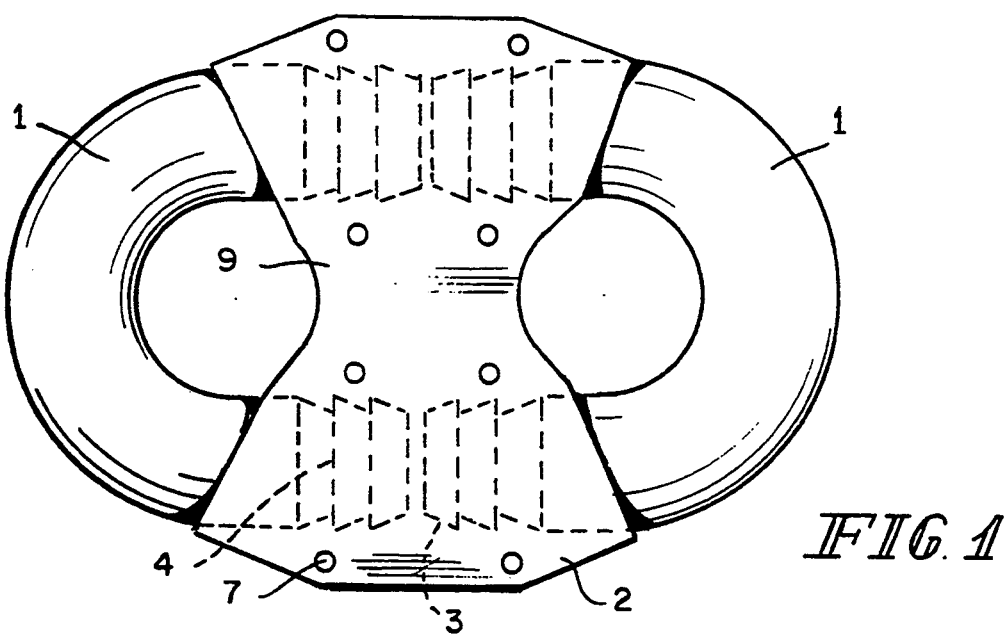
FIG. 1 is a top view of a detachable link according to the invention.
Figure 2:
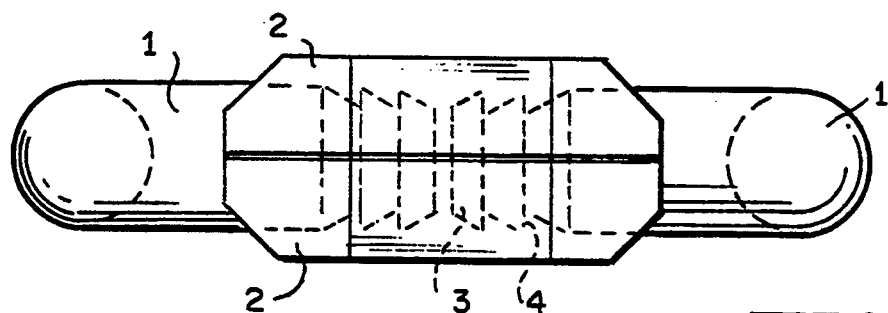
FIG. 2 is a front view thereof.
Figure 3:
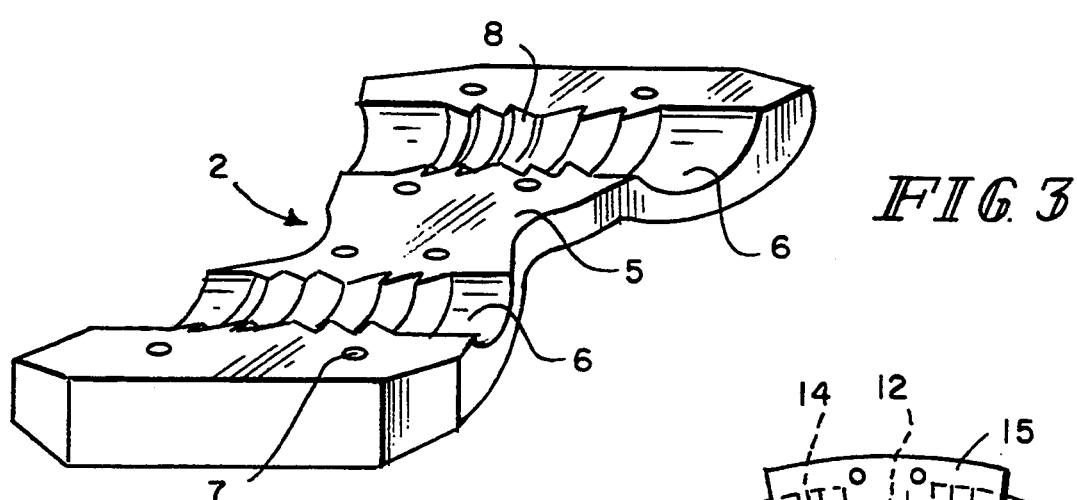
FIG. 3 is a perspective view of a half-shell after stamping.

FIGS. 1 and 2 show a first embodiment of the joining member which is composed of two half-links 1 and two half-shells (2). The half-links 1 may be created from round laminated bars cut to length. Relief grooves (3) are then formed at respective ends of these bars. In the embodiment illustrated in the drawings, these reliefs consist of annular grooves with a triangular cross-section forming ridges (4) which are substantially perpendicular to the axis of the bar and which are oriented toward the center of the bar. Of course, annular grooves of square or rectangular cross-section may also be used. The reliefs (3) may also be formed by cutting threads on the extremities of the bars. Alternatively, the half-links may be die-stamped so as to readily produce shapes of the same strength and to form the reliefs (3) directly. The half-links may also be produced by steel casting. Once the reliefs (3) have been formed, the bars are then bent in a U shape to produce the half-links (1) shown in FIGS. 1 and 2.

Each half-shell (2) is substantially in the form of a plate with at least one substantially plane surface (5) in which there are formed two semi-cylindrical parallel grooves (6). Those grooves (6) have the same diameter as the bars (1) and are spaced at a distance equal to the distance between the legs of the U's formed by the half-links.

These half-shells may be made of any metal that can be forged, with the surface of the grooves (6) being initially smooth or possibly preformed. Additionally, the half-shells (2) are provided with holes (7) for subsequently assembling two half-shells together, positioned so that they face one another. The half-shells (2) are then heated to forging temperature, and two half-shells are mounted over two half-links (1), the corresponding extremities of which have been positioned such that they face one another.

The assembly produced in this manner is placed in a press and stamped so as to form reliefs (8) on the inside surface of the grooves (6), which reliefs (8) are complementary with the reliefs (3) of the surface of the extremities of the half-links (1). The two half-shells (2) are then assembled by bolting. The result is a link comprising a bridge (9) over the gap formed by the two half-shells, which is only slightly thicker than a chain link made of a single piece, and which can therefore readily pass through mooring blocks. Moreover, this link may be readily disassembled and reassembled.

Figure 4:
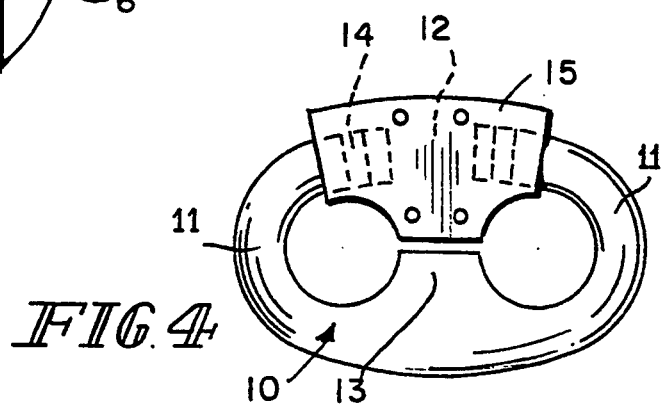
FIG. 4 is a top view of a link according to a further embodiment of the invention.
Figure 8A:
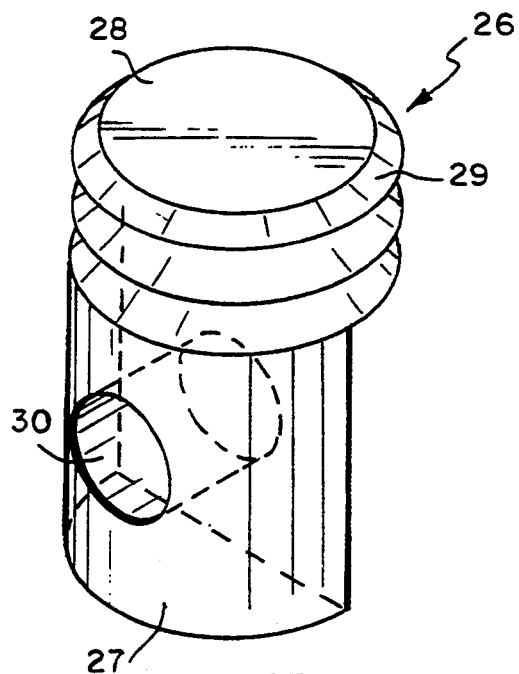
FIGS. 8a and 8b are perspective views of two half-pegs used to assemble the members of FIGS. 5 and 7.

In the embodiment of FIG. 4, the basic component of the link is an omega-shaped piece (10) displaying two lateral parts (11), the extremities of which are bent so that they face one another and define a space (12) between them. A center piece forming a projection (13) protrudes into the space (12). The extremities of the lateral parts (11) display reliefs (14) of the same type as the reliefs (3) described at FIGS. 1 and 2 hereinabove. These extremities of the lateral parts (11) are connected together by two half-shells (15). In a plan view, the two half-shells (15) display a T shape and each of the two half-shells (15) have a semi-cylindrical groove similar to the grooves (6) of the FIGS. 1 and 2 embodiment. The surface of these grooves is initially smooth. The two half-shells (15) are mounted on the extremities of the lateral parts (11) of the piece (10) and then forged to obtain the reliefs as described previously with the FIGS. 1 and 2 embodiments. After the reliefs are forged the two half-shells (15) are assembled by bolting. The result is a detachable link displaying the same general shape as that of FIG. 1, with the center part of the T of the half-shells (15) substantially meeting the projection (13).

FIGS. 5 to 11 show an alternative embodiment.

The link according to this embodiment is formed of two half-links (20) which are similar to the half-links (1) of FIGS. 1 and 2. These two half-links (20) contain reliefs at each of their respective extremities (21) and (21').

This link is also formed by joining the ends of the two half-links (20) with a sleeve (22) and two half-shells (23) similar to the half-shells (2) of FIGS. 1 and 2.

The sleeve (22) is perforated so as to form a hollow sheath into which the two opposing extremities (21) can be inserted when two half-links (20) face each other.

Figure 9:
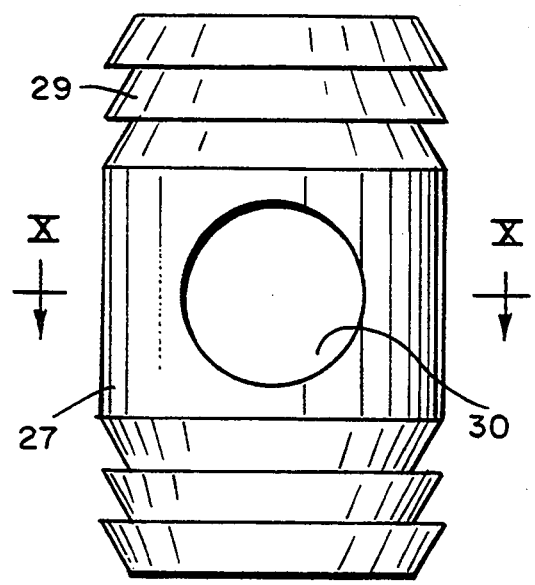
FIG. 9 illustrates the half-pegs of FIGS. 7a and 7b after they have been assembled.
Figure 8B:
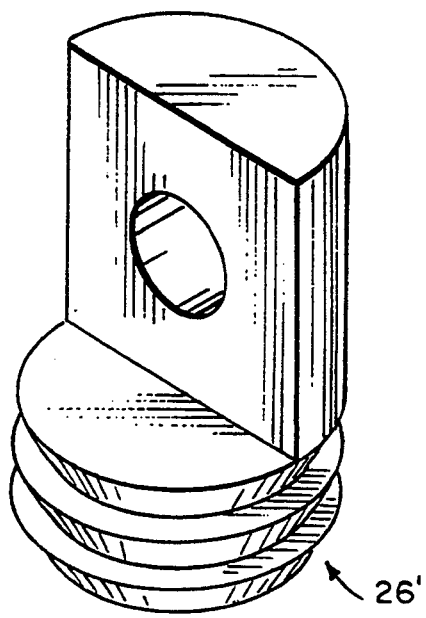
Figure 10:
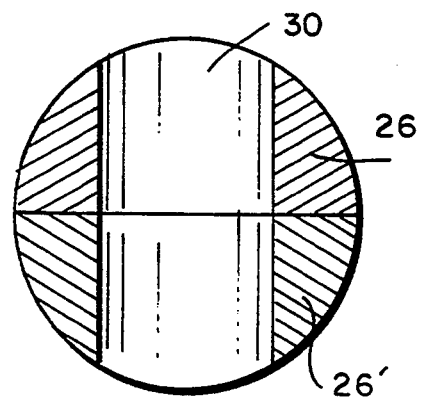
FIG. 10 is a cross-sectional view of FIG. 9 along line X—X.
Figure 11:
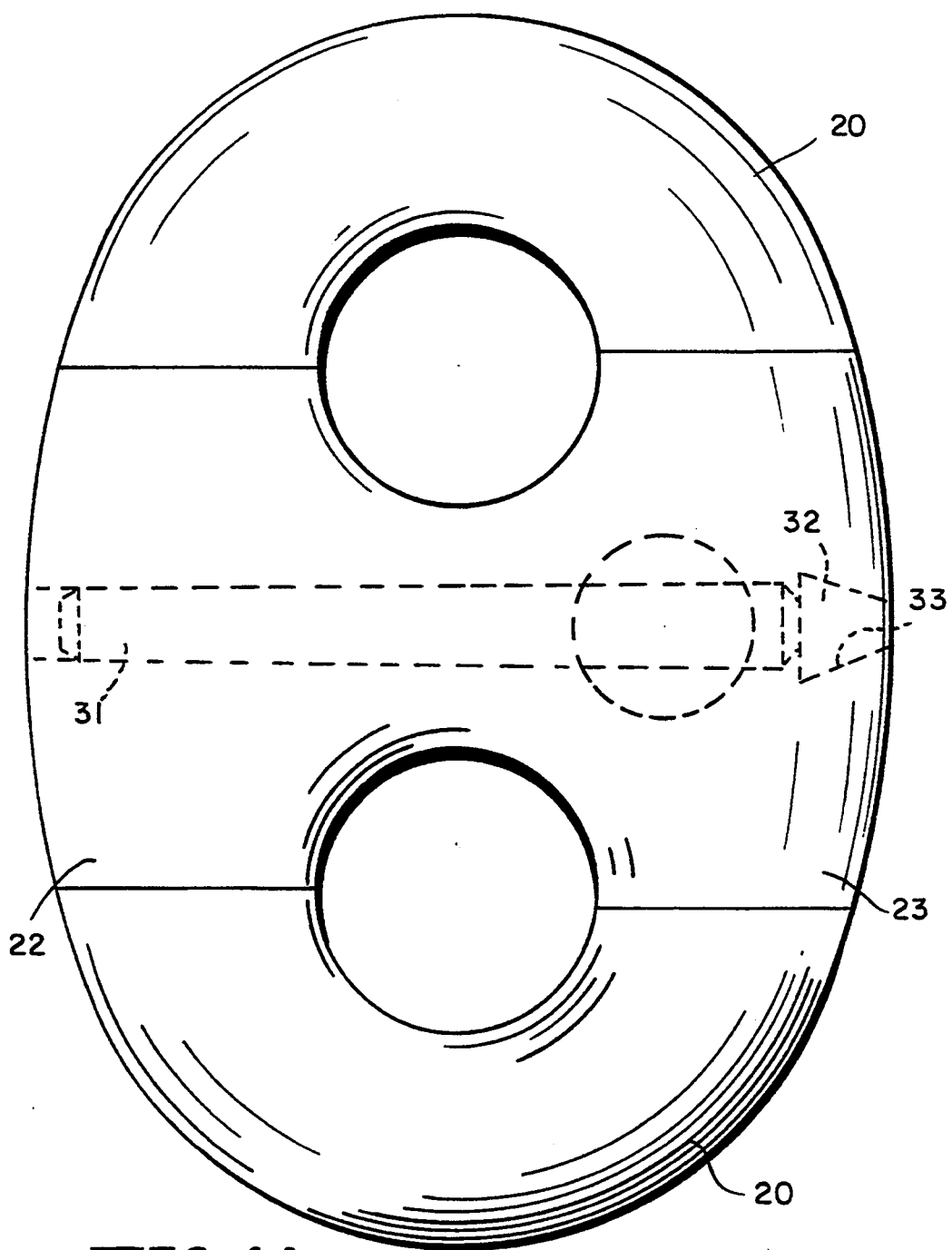
FIG. 11 illustrates a link assembled with members such as those illustrated in FIGS. 5 to 10.

Each half-shell (23) has two recesses (24) for the other two extremities (21') of the two half-links, and a cavity defined as a hole with a flat bottom (25), the purpose of which is described hereinbelow. The two half-shells (23) are assembled by means of a two-piece assembly comprising half-pegs (26) and (26'), as illustrated in FIGS. 8a, 8b, 9 and 10. Each half-peg comprises a semi-cylindrical body (27) and a head (28) which is generally cylindrical and of the same diameter, and coaxial to the body (27). The head (28) comprises reliefs (29) similar to those described at (3) in the FIGS. 1 and 2 embodiment. The semi-cylindrical body (27) of each of the half-pegs (26) is also perforated with a hole (30), the axis of which is perpendicular to the axis of the cylinder journal of the half-pegs and to the flat side of the body. Therefore, any two of the half-pegs are complementary and, when they are assembled as shown in FIGS. 9 and 10, they substantially form a cylinder with reliefs at its extremities and are perforated by a hole perpendicular to its axis.

The link is assembled in the following manner.

First, two half-pegs (26) (26¹) are assembled by placing their flat sides together with their reliefs (29) at opposite ends and are then preferably temporarily riveted through their holes (30).

The cylindrical peg thus formed is inserted in the hole (25) of one of the half-shells (23) with the axis of the hole (30) oriented such that it is transverse relative to the link, that is, perpendicular to the extremities (21) and (21') of the half-links.

The extremities (21') of two half-links are then placed in the corresponding recesses (24), while their extremities (21) are inserted in the hollow of the sleeve (22). The other top half-shell (20) is then mounted on top of the first half-shell (23) with its hole (25) receiving the free end of the cylindrical peg and its recesses (24) covering the extremities (21) of the half-links (20).

Of course, before they are mounted, the half-shells (23) and the sleeve (22) have been heated to forging temperature. The assembly is then forged with a press, thereby forging the reliefs on the inside of the recesses (24), of the sleeve (22) and of the holes (25) in a manner similar to that described in the FIGS. 1 and 2 embodiment.

The original riveting of the two pegs (26) therefore makes the assembly integral with the half-shells (23), thereby reducing distortions due to cooling or any heat treatment of the assembly.

The assembly is then disassembled by drilling a hole along the axis of the holes (30), of a diameter larger than that of those holes. This hole is drilled through to the other transverse extremity of the link and passes through the sleeve (22). This hole is tapered and is drilled while the components are held in a press, after which a tapered pin (31) is inserted, locked-in with a drop of solder (32) and held by an undercut (33) situated at the inlet of the tapered hole.

The link is very easily and quickly removed by tapping out the pin (31) from its narrow end.

The assembly operation is very easily performed in a single forging operation.

Although the present invention has been described and illustrated in detail, it is to be clearly understood that the same is by way of illustration and example only, and is not to be taken by way of limitation. The spirit and scope of the present invention are to be limited only by the terms of the appended claims.

We claim:

1. A process for assembling two facing extremities of members by means of two half-shells detachably joined by at least one assembly component, comprising the following steps:
    forming reliefs either on an inside surface of the half-shells, or on an outside surface of the member extremities with the outside surface of the member extremities or the inside surface of the half-shells respectively remaining smooth;
    then positioning the half-shells on the member extremities;
    then forging reliefs on the initially smooth half-shells or extremities by direct stamping onto the components displaying the reliefs;
    then detachably joining the two half-shells by said assembly components.

2. The process as claimed in claim 1, wherein the reliefs are initially formed on the extremities of the members.

3. The process of claim 1 wherein the reliefs are initially formed on the half-shells.

4. A process of fabricating a detachable link for assembling and disassembling chain segments, wherein the said link comprises at least two facing extremities of link members and two half-shells joined to one another by at least one assembly component for assembling the said extremities, comprises the following steps:
    forming reliefs either on an inside surface of the half-shells, or on an outside surface of the extremities of the link members with the outside surface of the member extremities or the inside surface of the half-shells respectively remaining smooth;
    drilling a hole partially through each half-shell, which holes will align with one another when the half-shells face one another;
    forming two complementary halves of assembly components, each having an extremity designed to be engaged in one of the said holes;
    forming reliefs on either the inside surface of the said holes, or on the outside surface of the extremities of the assembly components with the other of the surfaces remaining smooth;
    inserting each of the said extremities of the assembly components into respective ones of the said holes and mounting the half-shells on the extremities of the link members;
    forging reliefs on the initially smooth parts facing the reliefs that are preformed by direct stamping of the smooth surfaces on the said reliefs;
    joining the two half-shells by an assembly pin inserted through two aligned holes formed in overlapping parts of the two halves of the assembly components.

5. A process as claimed in claim 4, wherein the said aligned holes are drilled from the outside of the link after forging.

6. A process as claimed in claim 4, wherein the said holes are drilled before forging and are used to keep the halves of the assembly components temporarily assembled.

7. A process as claimed in claim 4 wherein the link is formed of two half-links having two pairs of facing extremities, wherein the other of the pairs of extremities are connected by a sheath, wherein reliefs are formed either on an inside surface of a sheath or on the outside surface of the extremities of the other of the pairs of extremities with the other surfaces thereof remaining smooth, wherein the said other extremities are placed in the sheath, and these other extremities are simultaneously forged with the aforesaid first extremities.

8. A detachable link for assembling and disassembling chain segments comprising:
    two-half links having two pairs of facing extremities;
    two half-shells joined to one another at a first pair of extremities by assembly components;
    an inside surface of the half-shells and an outside surface of the extremities of the link members containing complementary reliefs;
    each half-shell having a hole which will align with each other when the half-shells face one another;
    the assembly components including two complementary halves each extending from one of said holes;
    an inside surface of said holes and an outside surface of the extremities of the assembly components containing complementary reliefs while the other surface is smooth; and a pin which joins the two half-shells extending through two aligned holes formed in overlapping parts of the two complementary halves of the assembly components.

9. The detachable link of claim 8 further comprising a sleeve so as to form a hollow sheath into which connect a second pair of extremities.

10. The detachable link of claim 8 wherein the inside surface of each half-shell includes two recesses for the other of the first pair of extremities and wherein said hole in each of said half-shells comprises a cavity with a flat bottom.

11. The detachable link of claim 8 wherein said assembly components complementary halves include:

two complementary half-pegs which have a cylindrical body and a head coaxial to said body;

a flat on said body of each of said half-pegs; and a hole in each of said half-pegs having an axis perpendicular to said flat side of the body.

* * * * *